United States Patent
Evans et al.

(10) Patent No.: US 6,997,490 B2
(45) Date of Patent: Feb. 14, 2006

(54) INTEGRATED BUMPER ENERGY ABSORBER AND FASCIA SUPPORT COMPONENT

(75) Inventors: Darin Evans, Wixom, MI (US); Anthony Jackson, Canton, MI (US)

(73) Assignee: NetShape International LLC, Novi, MI (US)

( * ) Notice: Subject to any disclaimer, the term of this patent is extended or adjusted under 35 U.S.C. 154(b) by 0 days.

(21) Appl. No.: 10/895,500

(22) Filed: Jul. 21, 2004

(65) Prior Publication Data

US 2005/0017520 A1    Jan. 27, 2005

Related U.S. Application Data (60) Provisional application No. 60/489,031, filed on Jul. 22, 2003.

(51) Int. Cl.
*B60R 19/26*    (2006.01)

(52) U.S. Cl. .................. 293/120; 293/104; 293/115; 293/145; 296/187.09

(58) Field of Classification Search ............ 293/102, 293/103, 115, 117, 120, 142, 145, 155; 296/187.01, 296/187.03, 187.09, 203.01, 203.02; 29/897.2
See application file for complete search history.

(56) References Cited

U.S. PATENT DOCUMENTS

| | | | |
|---|---|---|---|
| 2,329,874 A | 9/1943 | Cadwallader et al. | |
| D152,010 S | 12/1948 | Macauley | |
| D152,398 S | 1/1949 | Darrin | |
| 3,744,835 A | 7/1973 | Carbone et al. | |
| D255,231 S | 6/1980 | Margiaria et al. | |
| 4,597,603 A | 7/1986 | Trabert | |
| D291,681 S | 9/1987 | Everts | |
| 4,770,457 A | 9/1988 | Tomforde | |
| D324,018 S | 2/1992 | Ueno | |
| 5,580,109 A | 12/1996 | Birka et al. | |
| 5,780,125 A | 7/1998 | Takeuchi et al. | |
| 6,082,792 A | 7/2000 | Evans et al. | |
| 6,575,510 B1 | 6/2003 | Weissenborn | |
| 6,609,740 B1 | 8/2003 | Evans | |
| 6,634,702 B1 | 10/2003 | Pleschke et al. | |

(Continued)

FOREIGN PATENT DOCUMENTS

FR    2655605 A1    6/1991

(Continued)

*Primary Examiner*—Patricia L. Engle
(74) *Attorney, Agent, or Firm*—Price, Heneveld, Cooper, DeWitt & Litton LLP (57) ABSTRACT

An integrated one-piece polymeric molded component includes an energy-absorbing section, a fascia-supporting beam section, and a plurality of connecting section connecting the energy-absorbing and fascia-supporting beam sections. The energy-absorbing section engages a front of a bumper beam and includes crush boxes configured to absorb impact energy during a vehicle crash. The connecting sections are strong enough to hold the energy-absorbing section and the fascia-supporting beam section together during assembly of the one-piece component onto a vehicle, but are flexible to allow collapse of the energy-absorbing section during a vehicle crash without damaging the fascia-supporting beam section. The beam section is channel-shaped and extends cross-car generally between headlamps of the vehicle, for providing added support structure to a front-end of the vehicle. The beam section includes air-redirecting ridges for optimal air flow and integral clips for wire management.

26 Claims, 8 Drawing Sheets

U.S. PATENT DOCUMENTS

| | | |
|---|---|---|
| 6,805,389 B1 | 10/2004 | Schellenberg |
| 6,874,831 B1 | 4/2005 | Pouget et al. |
| 6,880,882 B1 * | 4/2005 | Andre et al. ............ 296/193.09 |
| 2004/0124643 A1 | 7/2004 | Matsumoto et al. |
| 2004/0239128 A1 | 12/2004 | Lanard et al. |
| 2005/0017520 A1 | 1/2005 | Evans et al. |
| 2005/0046205 A1 | 3/2005 | Tanaka |
| 2005/0087999 A1 * | 4/2005 | Campbell et al. ............ 293/120 |

FOREIGN PATENT DOCUMENTS

| | | |
|---|---|---|
| FR | 2761330 A1 | 3/1998 |
| JP | 2001277963 A | 10/2001 |
| JP | 2002205613 A | 7/2002 |
| JP | 2002274298 A | 9/2002 |
| JP | 2002337634 A | 11/2002 |
| WO | WO 0100478 A1 | 1/2001 |

* cited by examiner

INTEGRATED BUMPER ENERGY ABSORBER AND FASCIA SUPPORT COMPONENT

CROSS-REFERENCE TO RELATED APPLICATIONS

This application claims benefit under 35 USC 119(e) of provisional application Ser. No. 60/489,031, filed Jul. 22, 2003, entitled INTEGRATED ENERGY ABSORBER AND FASCIA SUPPORT COMPONENT, the entire contents of which are incorporated herein in their entirety.

BACKGROUND

The present invention relates to front-ends and rear-ends of vehicles, and more particularly relates to an integrated bumper energy absorber and fascia-supporting component.

The front-end structure (and rear-end structure) of vehicles are relatively complex assemblies and include numerous parts and pieces. There are many reasons for this, including both styling and functional reasons. One functional reason is because the vehicle front and rear-end structures and associated bumper systems must not only be able to resist damage upon low-energy impacts, but must also allow the bumper to stroke, crush, and absorb substantial energy upon high-energy impacts, while still permitting the front-end structure to anchor and uniformly support fascia in and around the bumper, the headlights, and grill areas during normal vehicle operation. Typically, this is accomplished by using a variety of separate brackets, flanges, and braces that support the fascia in various areas, but with the bumper reinforcement beam and bumper system structurally separated from other front-end components and mounted to different parts of the vehicle frame and body so that the bumper reinforcement beam can stroke without damaging other front-end components. However, it is desirable to minimize weight and simplify assembly, which is difficult to do when there are multiple parts. Concurrently, it is not clear from prior art how to maintain the separate function of a bumper system and a fascia-supporting system, while providing a single part that satisfies parts of the functions of both the bumper and fascia-supporting systems.

It is desirable to reduce a number of the parts and pieces that provide the front-end structure of modern vehicles, while still maintaining structural stability of a front of the vehicle and a low total weight. It is also desirable to integrate and consolidate features and functions of the present front-end components into fewer parts and pieces to reduce a total cost and complexity of the assembly, while at the same time reducing assembly time. In particular, it is desirable to incorporate some of the bumper components and functions into other front-end structural components, while still maintaining effective independent operation of an associated bumper system.

Accordingly, an apparatus is desired solving the aforementioned problems and having the aforementioned advantages.

SUMMARY OF THE PRESENT INVENTION

In one aspect of the present invention, an improvement is provided for an end-forming component for a motor vehicle, where the component has an energy-absorbing section and a fascia-supporting beam section, with the energy-absorbing section being adapted to engage a face of a reinforcement beam and absorb energy upon a vehicle crash, and the beam section being adapted to support a vehicle fascia for aesthetics. The improvement includes at least one connecting section connecting the energy-absorbing section to the fascia-supporting beam section and that is formed from material extending integrally and continuously from the energy-absorbing section and the beam section. The at least one connecting section retains the energy-absorbing section and the fascia-supporting beam section together during assembly of the one-piece component onto a vehicle, but is flexible in a horizontal direction to allow movement and collapse of the energy-absorbing section during the vehicle crash without forcing concurrent movement of the fascia-supporting beam section and without causing undesired damage to other vehicle components.

In another aspect of the present invention, a motor vehicle has a polymeric molded component including a lower section adapted to absorb energy upon a vehicle crash to reduce vehicle damage and passenger injury, and including an upper section for supporting fascia above and around the lower section. An improvement includes a connecting section connecting the upper and lower sections to facilitate simultaneous assembly to the motor vehicle. However, the connecting section is flexible to allow the lower section to stroke with a reinforcement beam during the vehicle crash while the upper section remains relatively stationary on the vehicle, such that the vehicle fascia and other vehicle front or rear-end components undergo less damage during the vehicle crash.

In another aspect of the present invention, a method is provided for assembling an energy-absorbing section and a fascia-supporting beam section to a vehicle front or rear-end, including positioning the energy-absorbing section on a reinforcement beam and positioning fascia on the fascia-supporting beam section. The method comprises steps of connecting the energy-absorbing section to the fascia-supporting beam section using connecting sections made with material continuous to the energy-absorbing and fascia-supporting beam sections. The connecting sections are configured to and adapted to support the energy-absorbing section under the fascia-supporting beam section for handling as a one-piece component during assembly, but are configured to flex after assembly to minimize transmission of vibration from the bumper beam to the energy-absorbing section.

In another aspect of the present invention, a structural component for a motor vehicle for supporting fascia along an end of the vehicle, comprises a beam section configured and adapted to support fascia at selected locations across a front end of a vehicle; the beam section, when positioned in a vehicle-mounted position, extending horizontally. Spaced apart corner-forming structures extend downwardly from the beam section and form at least one air-flow aperture therebetween that is below the beam section, the corner-forming structures each having a front surface contoured and shaped to support the vehicle fascia at selected locations but that is adapted to be spaced from the fascia in other locations, and further the corner-forming sections having vertical ridges that closely engage a rear surface of the fascia to seal off undesired lateral air flow between the fascia and the corner-forming sections.

In another aspect of the present invention, a structural component for a motor vehicle, comprises an energy-absorbing section having a base flange adapted to matably engage a face surface of a reinforcement beam and having crush boxes formed forwardly from the base flange for absorbing impact energy upon a vehicle crash. At least one downwardly-extending air scoop includes walls forming a forwardly-facing and inwardly-open concavity under the energy-absorbing section and causes air flow to be directed inwardly toward a center of the structural component.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
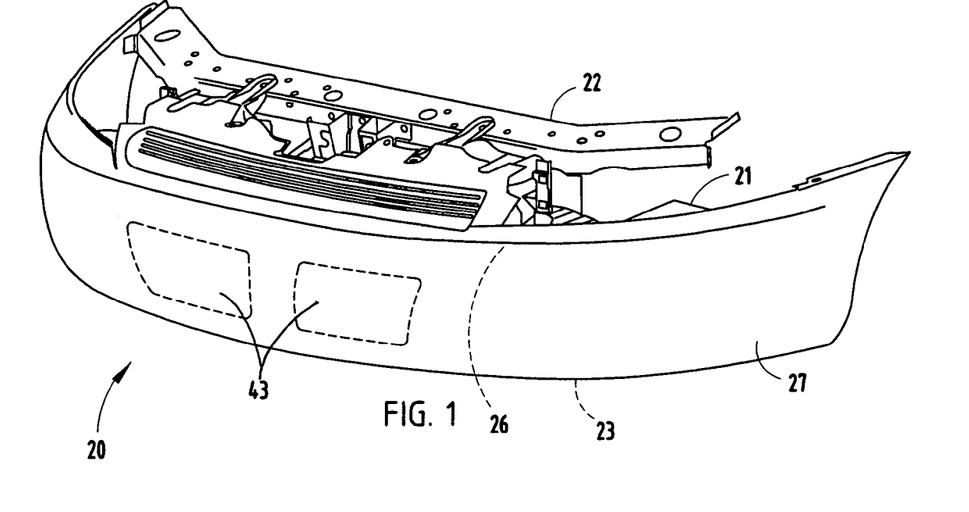
FIG. 1 is a front perspective view of a vehicle front-end structure embodying the present invention, including a one-piece molded component incorporating an energy-absorbing section, a fascia-supporting beam section, and connecting sections integrally connecting the two sections.
Figure 2:
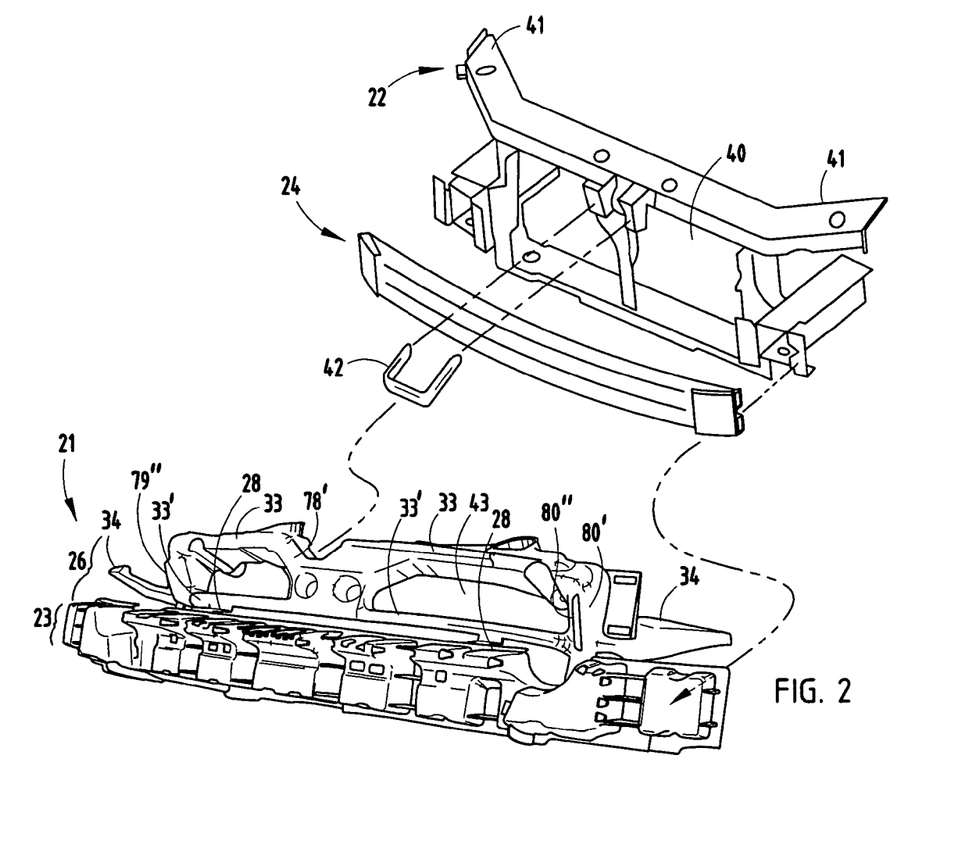
FIG. 2 is a front perspective view similar to FIG. 1, but with the fascia removed and with the underlying components exploded apart.
Figure 4:
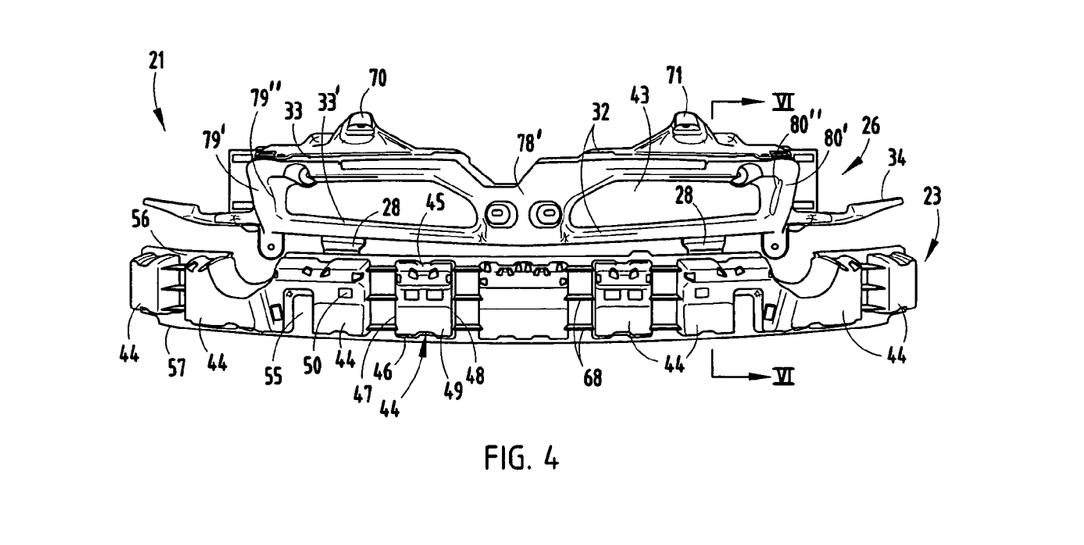

A vehicle front-end 20 (FIG. 1) includes an integrated one-piece polymeric molded component 21 configured for attachment both to a radiator support 22 and to a rigid bumper beam 24. The one-piece component 21 includes an energy-absorbing section 23 (FIG. 2) configured to be supported on a front face of the bumper reinforcement beam 24 (which is in turn supported on the vehicle frame), a beam section 26 (which can include one or more molded beam sections 33 and 33'—see FIG. 2) configured to be supported by the radiator support 22 in front of the vehicle hood and between the vehicle headlights, and a plurality of integrally-formed connecting sections 28 (FIG. 4) (two illustrated) that connect the energy-absorbing and beam sections 23 and 26. Advantageously, the energy-absorbing section 23 and beam section 26 are configured to support fascia 27, while permitting the reinforcement beam 24 to stroke during a vehicle impact without causing undesirable damage to the radiator support 22 and other components in the vehicle front-end, as discussed below.

More specifically, the energy-absorbing section 23 includes a plurality of crush boxes 44 (FIG. 4) configured to crush against the reinforcement beam 24 and to absorb impact energy during a vehicle crash prior to collapse of the reinforcement beam 24. The connecting sections 28 are strong enough to hold the energy-absorbing section 23 and the fascia-supporting beam section 26 together during assembly of the one-piece component 21 onto the vehicle, but are flexible, making them sufficiently flexible to allow collapse and "stroking" of the energy-absorbing section 23 during a vehicle crash without undesirably stressing and damaging the fascia-supporting beam section 26 and/or radiator support and/or the fascia 27 and/or other front-end components. The connecting sections 28 also effectively decouple and vibrationally insulate the sections 23 and 26 so that road vibrations are not transmitted between sections 23 and 26.

Radiator supports and vehicle bodies are well known in the industry and a detailed description of them is not necessary for an understanding of the present invention. The illustrated radiator support 22 (FIG. 2) includes top, bottom, side and vertical-center frame members each of which are channel-shaped or tubular, and that are attached together to form a rectangular frame for receiving and supporting a radiator and for permitting air flow thereto. Outer ends 41 of the top frame member are angled rearwardly for satisfying design and styling criteria while also providing structure to the corners and fenders of the vehicle. Brackets and laterally extending structure on the radiator support 22 and/or other vehicle front end structure and bracketry support headlights and cornering lamps in outboard locations at corners of the vehicle. Also, a center bracket 42 (FIG. 2) attaches a center of the beam section 26 to the illustrated radiator support 22.

Vehicle fascia are also well known in the vehicle art. The illustrated fascia 27 (FIG. 1) is made from a flexible RIM urethane, TPO, or similar resilient paintable material. A grill opening 43 (optional, useful for permitting air flow in vehicle front ends) is formed in the illustrated fascia 27. A grille with a matrix of bars can be integrally formed in the opening 43 or can be a separately formed part attached to the fascia 27 and/or attached to the component 21. It is also contemplated that various other mounts can be constructed on the component 21, such as for mounting cornering lamps, other exterior vehicle lighting and signaling lamps, and the like. The grill preferably is configured with spaced-apart bars to allow air flow therethrough but the bars deflect large objects from passing therethrough. The fascia 27 (and grill if present) are aesthetically coated, painted, or molded in a color suited for vehicle aesthetics.

As noted above, the illustrated component 21 (FIG. 4) includes an energy-absorbing section 23, a fascia-supporting beam section 26, and a pair of integrally-formed connecting sections or straps 28 connecting the sections 23 and 26. It is noted that the illustrated right and left halves of the component 21 are mirror images and are symmetrical when the component 21 is bisected through its center by a vertical plane. However, it is to be understood that the right and left halves do not need to be symmetrical, and in fact often will not be symmetrical where features are integrated into the component 21 that do not require symmetry. For example, features that are not styling related and do not require symmetry include such as things as wire management clips, wire routing passages, and mounts for license plate lights incorporated into the component 21, as discussed below.

Figure 3:
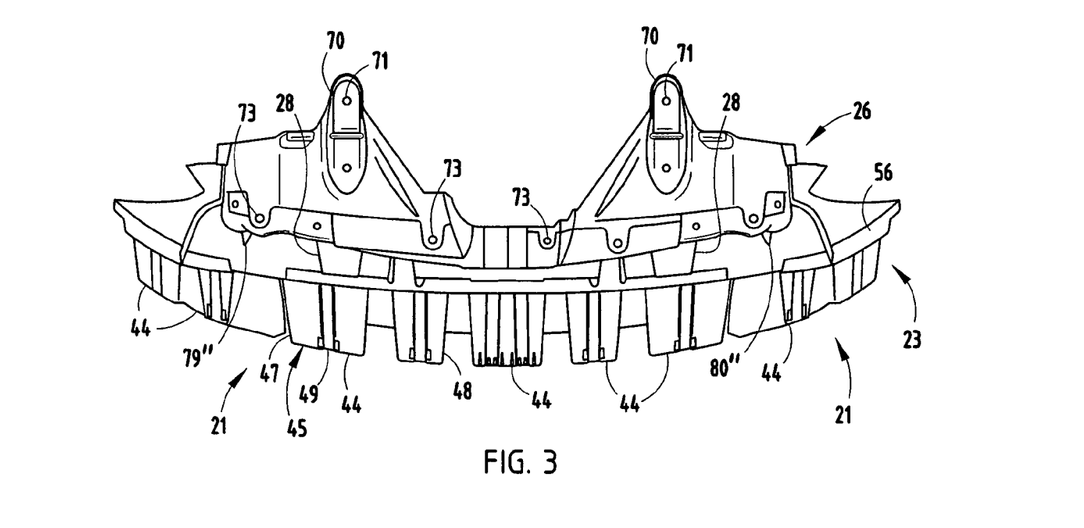
FIGS. 3–5 are top, front, and side views of the component in FIG. 2.
Figure 5:
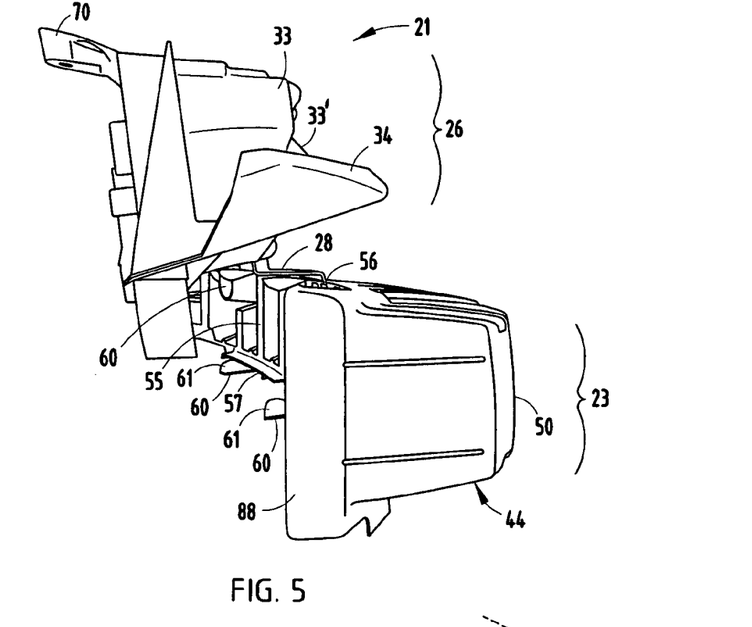
Figure 13:
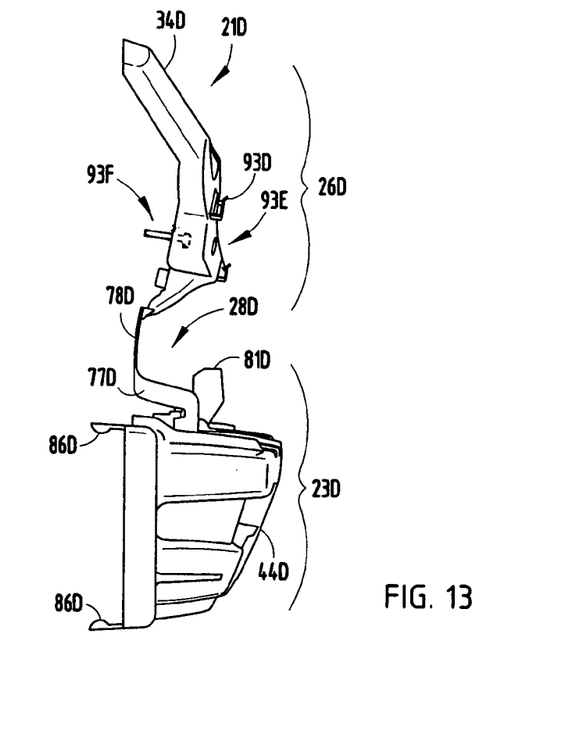

The energy-absorbing section 23 (FIG. 3) is elongated and includes a base flange that extends arcuately around a front of the vehicle for matching an aerodynamic curved shape of the bumper reinforcement beam 24. The illustrated energy-absorbing section 23 includes a plurality of crush boxes 44 formed forwardly from the base flange 55 along its length. The illustrated crush boxes 44 are different shapes and sizes, and are particularly constructed and tuned (such as by adjusting wall thickness, or by cutting apertures into the walls, or by adjustment material properties) to absorb predetermined amounts of energy during a vehicle crash, in order to pass impact test requirements of government Federal Motor Vehicle Safety Standards (FMVSS) and/or in order to pass impact requirements of the Insurance Institute of Highway Safety (IIHS). Each crush box 44 includes top, bottom, and opposing side walls 45–48 (FIG. 4) and further includes a front wall 49. The crush boxes 44 are tuned for particular regional impact strength. For example, some of the illustrated walls 45–48 are wavy shaped for increased wall strength. Also, some of the front walls 49 may include an aperture 50, and further may include a tubular structure (not specifically shown) extending rearwardly from edges of the aperture 50 to create an internal collapsible tower for increased energy absorption. The front walls 49 of the illustrated center crush boxes 44 may extend vertically (see FIG. 5) or may include an upper portion that is located forwardly of and protrudes beyond a lower portion of the front walls 49 (see FIG. 13) in order to better match a profile and shape of the fascia 27. A foam filler or other filler (not shown) can be placed in spaces formed along a front face of the crush boxes 44, if desired.

The illustrated energy-absorbing section 23 (FIG. 4) includes a rear-located base wall 55 (also called a base flange) that extends between the adjacent side walls 47 and 48 of adjacent crush boxes 44, connecting each adjacent crush box 44. Top and bottom flanges 56 and 57 (FIG. 7) extend rearwardly from the top and bottom walls 45–46 of the crush boxes 44, and include anti-rattle protrusions 60 with enlarged radiused ribs 61 that engage depressions in top and bottoms of the bumper reinforcement beam 24 (FIG. 6) to reduce rattling and to temporarily retain the energy-absorbing section 23 on the beam 24. The illustrated reinforcement beam 24 (FIG. 6) is "B" shaped, and includes top and bottom tubes 58 and 59. However, it should be understood that alternatively shaped reinforcement beams can be used. Three parallel horizontal longitudinal parallel walls 68 (FIG. 4) connect the outermost crush box 44 to the next-inboard crush box 44 providing additional energy absorption capacity directly in front of the frame rails.

Figure 14:
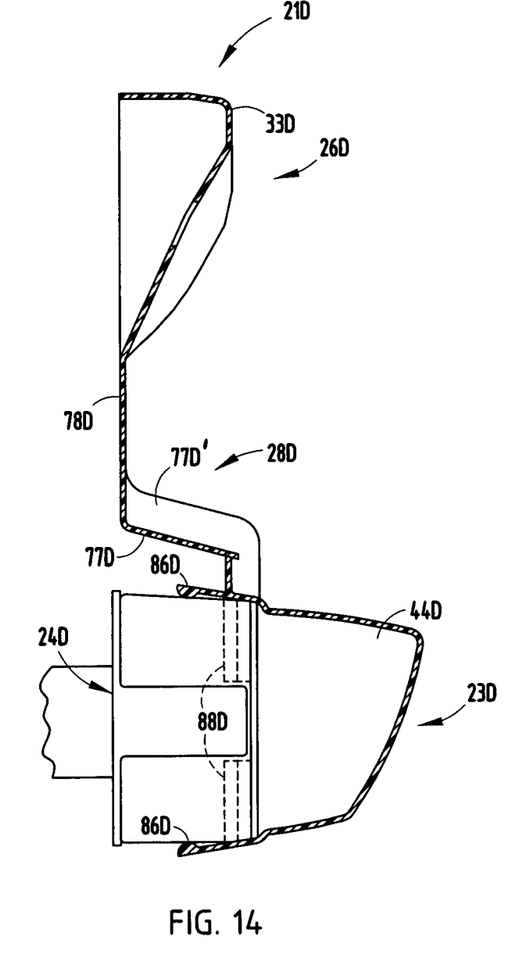
FIG. 14 is a cross section taken along the line XIV—XIV in FIG. 12.
Figure 15:
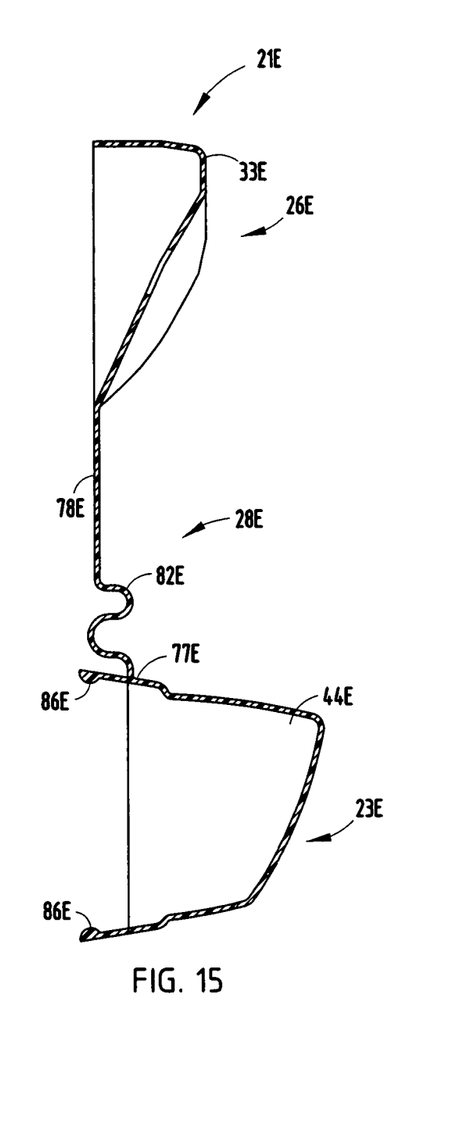
FIG. 15 is a modification of the cross section of FIG. 14.
Figure 16:
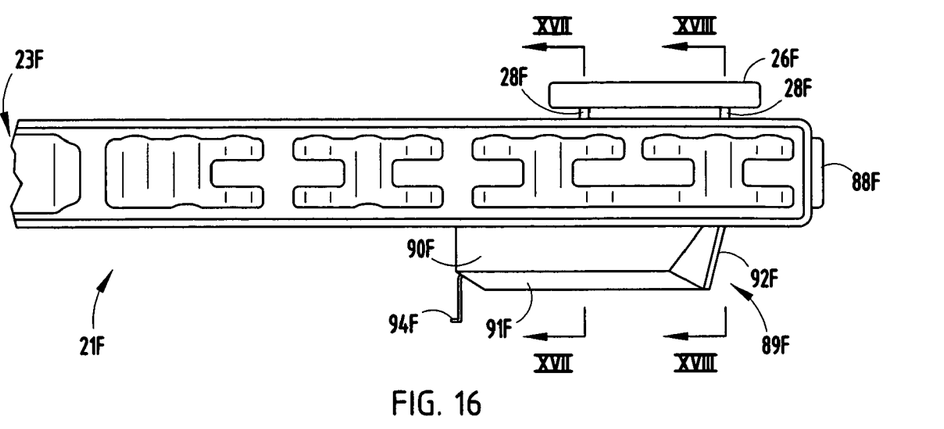
FIG. 16 is a front view of a second modified end structure embodying the present invention, including another on-piece molded component having features similar to that of FIGS. 2 and 9.

In addition to anti-rattle protrusions 60, similarly shaped protrusions 88 (FIG. 5) are formed on ends of the energy-absorbing section 23. The protrusions 88 are located and shaped to snap-fit into open ends of the B-shaped reinforcement beam 24 to both help retain the component 21 on the beam 24, and also to center energy-absorbing section 23 of the component 21 on the beam 24. Ends of the protrusions 88 are ramped to facilitate their snapping engagement with the beam 24, and are undercut as needed to create a friction pad or hook to provide for secure attachment and for anti-rattle. (Compare to protrusions 86D and 88D shown in FIG. 14.)

It is contemplated that the present energy absorber construction can be made from XENOY material, a material manufactured by GE Company and usable for energy absorbers. Alternatively, it is contemplated that the energy-absorbing section 23 can be any of a variety of different energy-absorbing constructions and made from different engineering materials that are known in the art of molded polymeric bumper energy absorbers.

The fascia-supporting beam section 26 of component 21 (FIG. 4) includes crossbeams 32 and 32' each having top, bottom, and front walls 74–76 forming a rearwardly facing C-shaped section. The channel-shaped sections 33 and 33' are supported in spaced relation by a center structure 78' and corner-forming structures 79' and 80'. Large openings 43 are formed therebetween for air flow to the vehicle's radiator and engine, and also to provide added support structure to a front-end of the vehicle in and around a front of the vehicle hood as desired. Angled "hand" portions 34 extend outwardly from ends of the beam section 26 to support the vehicle front fascia 27 under the headlamp areas. Rearwardly extending arms 70 and 71 include holes for receiving bolts to secure the beam section 26 securely to the radiator support 22 and other vehicle front-end structure. Additional holes 73 (FIG. 3) are provided in the beam section 26 for allowing additional attachment of vehicle components, such as for fender attachment and for receiving rubber hood slam bumpers to cushion movement of the hood when being closed. Also, various mounts can be formed integrally into the beam section 26, such as for supporting cornering lamps, wiring, and other options and features in and around the front of the vehicle.

The connecting sections 28 (FIG. 6) extend rearwardly from a rear, upper edge of the energy-absorbing section 23 and extend upwardly to a lower part of the beam section 26. Specifically, the illustrated connecting sections 28 include a rearwardly extending horizontal leg 77 extending from a top edge of the base wall 55 and top flange 56, and an upwardly extending vertical leg 78 that extends upwardly from horizontal leg 77 into engagement with a rear edge of the lower wall 75 of the lower channel section 33'. The L-shaped arrangement of the connecting sections 28 is flexible and adapted to provide several functions beyond just securing the sections 23 and 26 together. Notably, if the vehicle receives an impact from direction 80, the energy-absorbing section 23 initially crushes and absorbs impact energy, and then the reinforcement beam 24 and energy absorber section 23 stroke rearwardly, with the horizontal leg 77 folding back on itself, and with the vertical leg 78 flexing angularly to reduce force transmission from the energy-absorbing section 23 to the fascia-supporting beam section 26. Also, the horizontal leg 77 is adapted to flex to reduce transmission of vibration from the energy-absorbing section 23 to the beam section 26 during normal vehicle operation (i.e. to dampen road vibrations). It is also noted that the L-shaped arrangement of the connecting sections 28 also provides an ability to compensate for dimensional variations that occur during vehicle assembly between the reinforcement beam 24 and the radiator support 22. Thus, the present arrangement is said to "decouple" the energy-absorbing section 23 from the fascia-supporting beam section 26.

The illustrated corner-forming structures 79' and 80' of the component 21 (FIG. 2) include forwardly-facing vertical ridges 79" and 80", respectively, (also sometimes called an "air dam" or "air redirector") that are positioned outboard of the air opening 43 for the grille. It is noted that the corner-forming structures 79' and 80' include a contoured front surface configured to support the fascia 27 in as many locations as needed to prevent drooping of the fascia 27 and for a clean aesthetic appearance. However, the corner-forming sections 79' and 80' do not support the fascia in all locations, since it is important to minimize the material of the component 21 where possible to save cost and minimize weight. Gaps and holes in the component 21 and gaps between the component 21 and the fascia 27 can be problematic because back pressure of air against the radiator can cause air to escape laterally in a sideways direction during operation of the vehicle. For this reason, the ridges 79" and 80" are provided on the beam section 26. The ridges 79" and 80" extend forward from a front surface of the corner structures 79' and 80' and into close engagement with a rear surface of the fascia 27, so that they reliably seal off undesirable lateral air flow under the fascia 27. The ridges 79" and 80" tend to redirect air and force it through the opening 43 and tend to prevent the air from escaping laterally away from the opening 43.

It is contemplated that the ridges 79" and 80" can be any size and shape as optimally suited for their intended air sealing function. The illustrated ridges 79" and 80" are preferably a single wall thickness of about $\frac{1}{8}^{th}$ inch thick, and extend about 3 inches vertically (i.e. a height about equal to a height of the aperture 43) and extend about 1 inch in a forward direction. Nonetheless, it is contemplated that the ridges 79" and 80" could be a double wall thickness, and could be smaller, such as about 2 inches vertically and ½ inch in a fore-aft direction, depending on the shape of the fascia and the degree of air escapement problem under the fascia and the relative position of the corner structures 79', 80' and the fascia 27. The outer edge of the illustrated ridges 79" and 80" are curvilinearly shaped to match a shape of the mating interior surface on the fascia 27. It is contemplated that an outer end of the ridges 79" and 80" can be made to include a resilient and/or flexible flap to assure that the ridges 79" and 80" reliably accomplish their air-sealing function, however this is not believed necessary at this time. As will be understood by people skilled in the art of vehicle design, air flow to an engine (including its radiator) is critical for maintaining proper cooling and temperature control of a vehicle engine. Air baffles and seals are often used to control air flow in an around a vehicle front end, especially where the air could flow away from the air opening 43 due to back pressure in the air opening as air flows against a radiator. Such air baffles and seals are often developed late in a vehicle development program, and hence they typically are "added" separate components that are not well-integrated into existing parts. The illustrated ridges 79" and 80" are positioned where their height can be easily adjusted by adjusting a depth of the recess in the molding dies for molding the ridges 79" and 80" in the component 21. This allows the ridges 79" and 80" to be formed integrally in the component 21, yet advantageously allows for late low-cost adjustments to the molding dies to improve the air sealing characteristic of the ridge when used in combination with the fascia 27. It is noted that forwardly-extending and rearwardly-extending horizontal and vertical ridges could also be included on any of the beams 33 and 33' and the center section 78' if desired.

Additional embodiments are illustrated in FIGS. 7–16. In these views, the same and similar parts, features, and characteristics are labeled using the same number but with the addition of a letter "A", "B" and etc. This is done to reduce redundant discussion. Nonetheless, persons skilled in the art will understand that the present concepts are inter-related.

Figure 6:
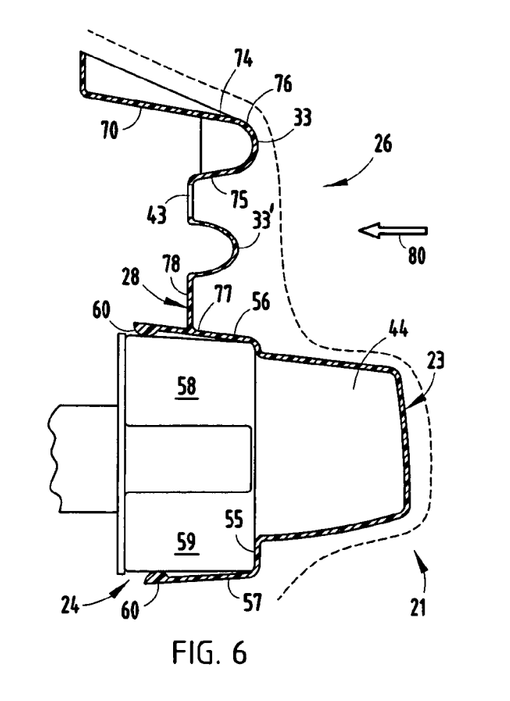
FIG. 6 is a cross section taken along the line VI—VI in FIG. 4.
Figure 7:
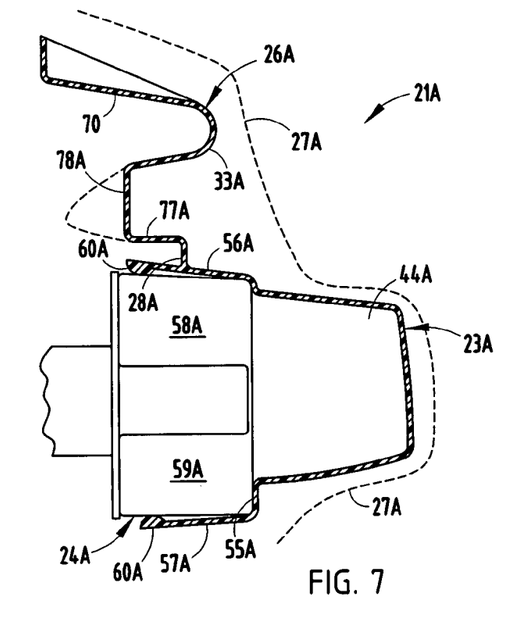
FIGS. 7–8A are perspective views of modified versions of FIG. 6.

FIG. 7 illustrates an arrangement where a component 21A includes a connecting section 28A that is similar to component 21 in FIG. 6, but the beam section 26A only has a single channel-shaped section 33A.

It is contemplated that the legs 77 and 78 can be modified an even greater extent to decouple the energy-absorbing section 23 to the fascia-supporting beam section 26. For example, in FIG. 8, the modified component 21B includes a connecting section 28B having a double U-shaped bend 82B in the vertical leg 78B. This both decouples the sections 23B and 26B during a vehicle crash, and also vibrationally decouples the sections 23B and 26B by permitting even greater stretch and vertical extensibility between the sections 23B and 26B. For example, the addition of the U-shaped bend 82B creates a vertically flexible zone permitting the beam section 33B to be adjusted vertically as shown by the dashed lines in FIG. 8. Thus, relatively large dimensional variations can be accommodated between the reinforcement beam and other front-end structures. Further, it is contemplated that this could be used to allow a particular component 21B to be used on different vehicle models where the spacing between sections 23B and 26B is different.

Figure 8:
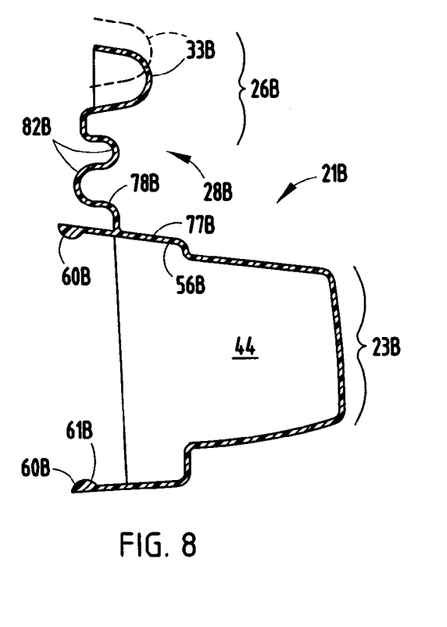
Figure 8A:
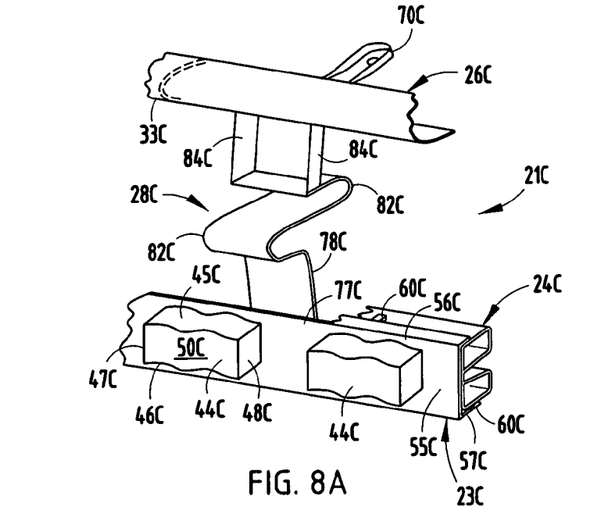
Figure 9:
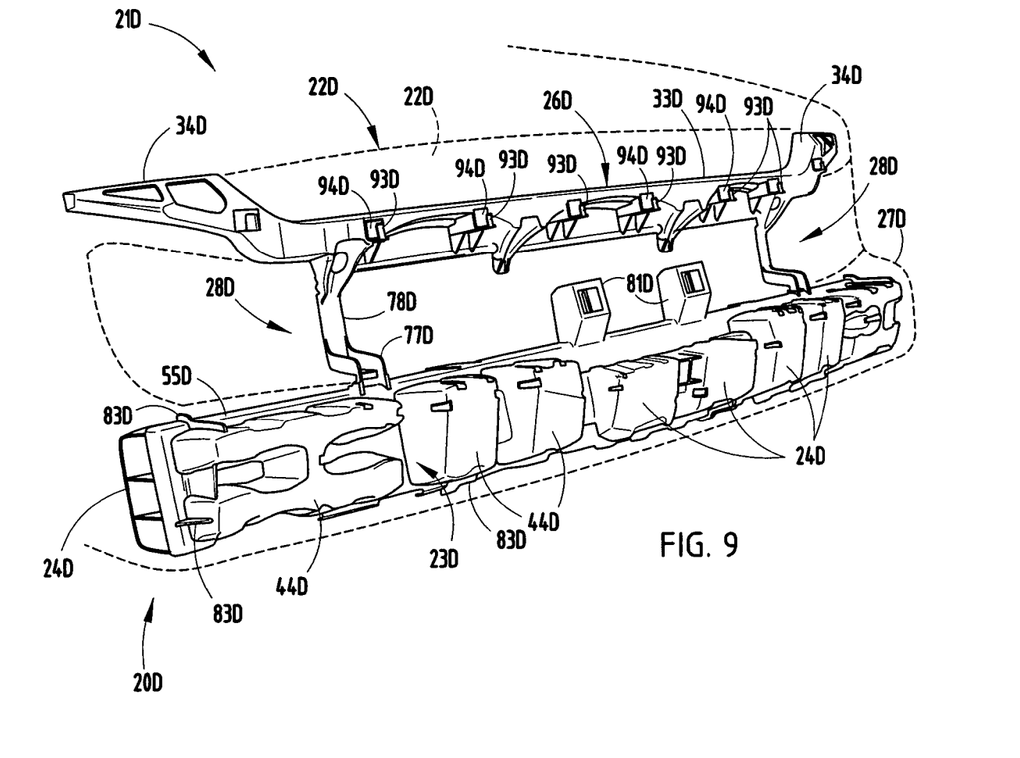
FIG. 9 is a perspective view of a vehicle rear-end structure embodying the present invention, including another one-piece molded component having features similar to that of FIG. 2.
Figure 10:
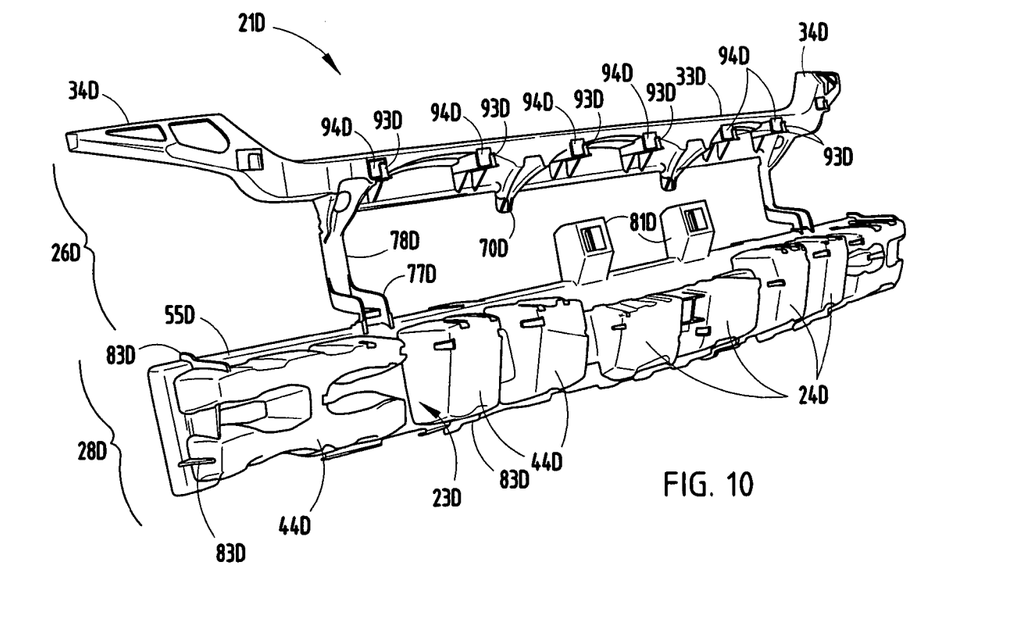
FIG. 10 is a perspective view of FIG. 9.
Figure 11:
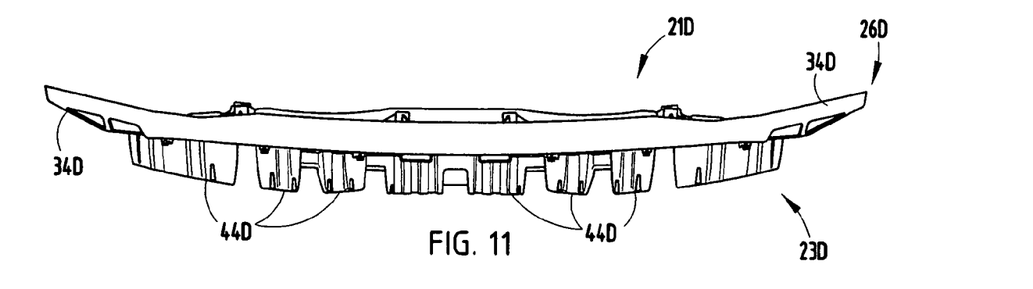
FIGS. 11–13 are top, front, and side views of FIG. 10.
Figure 12:
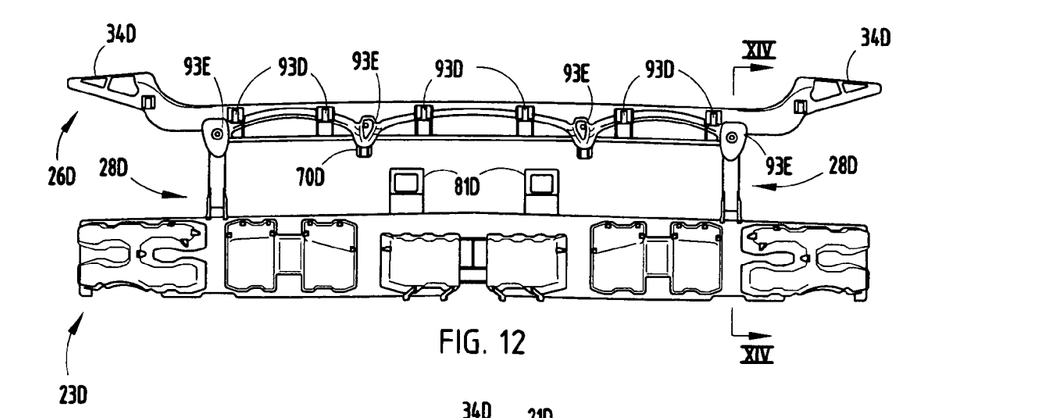

In FIG. 8A, the illustrated component 21C includes a connecting section 28C similar to the connecting section 28B but that is still further modified. The vertical leg 78C of the connecting section 28C includes a pair of parallel vertical walls 84C positioned above the U-shaped bend 82C. The walls 84C form a parallelogram-shaped structure that connects an upper end of the bend 82C to the beam section 26C. The lower end of the U-shaped bend 82C is still connected to the energy-absorbing section 23C. The walls 84C are adapted to flex in a side-to-side direction, thus reducing lateral vibration from the energy-absorbing section 23C to the beam section 26C and also permitting lateral shifting to facilitate vehicle assembly. By this arrangement, the energy-absorbing section 23C is also decoupled from the beam section 26C in a lateral direction. This can also be important for improved corner impact testing.

The present inventive concepts are also useful in vehicle rear-end constructions. A vehicle rear-end 20D (FIG. 9) includes an integrated one-piece polymeric molded component 21D configured for attachment both to a rear-end panel support structure 22D of a vehicle body and to a rigid bumper reinforcement beam 24D. Specifically, the one-piece component 21D includes an energy-absorbing section 23D configured to be supported on a front face of the bumper reinforcement beam 24D (which is in turn supported on the vehicle frame), a molded beam section 26D configured to be supported on the rear-end support 22D adjacent the trunk lid and between the vehicle tail-lights, and a pair of connecting sections 28D (FIG. 10) that connect the energy-absorbing and upper-supporting beam sections 23D and 26D. Like component 21, the energy-absorbing section 23D and beam section 26D are configured to support a fascia 27D, while permitting the reinforcement beam 24D to stroke during a vehicle impact without causing undesirable damage to the rear-end support 22D and other components in the vehicle front-end, as discussed below. The illustrated beam section 26D includes a plurality of L-shaped clips 93D that extend forward of an aperture 94D along a front face of the beam section 26D. The clips 93D are configured to frictionally engage a wiring harness (not specifically shown), such as for communicating electrical power horizontally along a rear of a vehicle to rear tail lights, license plate courtesy lamp, and to a power trunk lock. The apertures 94D permit molding of the clips 93D without the need for slides in the molding dies, since a projection on the tool can extend from the molding die through the aperture(s) 94D to form the clips 93D, with the projection extending in alignment with a direction of the molding die movement during the molding process. Notably, the clips 93D can extend forward or rearward of the beam section 26D, or can be positioned on the energy-absorbing section 23D (such as for trailer wiring). The illustrated beam section 26D can be attached to the vehicle body-in-white via pressed in studs (93F) or other methods at locations (93E).

More specifically, the energy-absorbing section 23D includes a plurality of crush boxes 44D (FIG. 9) configured to crush against the reinforcement beam 24D and to absorb impact energy during a vehicle crash prior to collapse of the reinforcement beam 24D. The connecting sections 28D are integrally formed of the material of the sections 23D and 26D. The connecting sections 28D are strong enough to hold the energy-absorbing section 23D and the fascia-supporting beam section 26D together during assembly of the one-piece component 21D onto the vehicle, but include a flexible region making them sufficiently flexible to allow collapse and "stroking" of the energy-absorbing section 23D during a vehicle crash without undesirably damaging the fascia-supporting beam section 26D and/or rear-end support and/or the fascia 27D and components connected to the component 21D. As illustrated, the connecting sections 28D (FIG. 14) include a rearwardly extending horizontal leg 77D and a vertically extending leg 78D. The horizontal leg 77D includes a pair of upright parallel sections 77D' forming a parallelogram arrangement that permits some lateral shifting of the energy-absorbing section 23D relative to the beam section 26D, such as during a corner impact. The vertical leg 78D is elongated and is relatively flat, such that it is flexible to permit the energy-absorbing section 23D to stroke during a vehicle crash without the beam section 26D being undesirably stressed by movement of the energy-absorbing section 23D. The connecting sections 28D also effectively decouples or vibrationally insulates the sections 23D and 26D so that vibrations are not transmitted between sections 23D and 26D. License plate mounting stands 81D (FIG. 10) are provided on the energy-absorbing section 23D that extend upwardly from the section 23D. The mounting stands 81D include recesses for receiving screw-receiving nuts.

Notably, the energy absorber section 23D (FIG. 10) includes a protruding exterior stiffening flange 83D that extends from one of the top and bottom walls of the crush boxes 44D onto the base wall 55D and flange 56D. The stiffening flange 83D stiffens the associated crush box 44D. Also, the stiffening flange 83D helps prevent the energy-absorbing section 23D from slipping upwardly onto and over the reinforcement beam 24D during a vehicle impact, by preventing undesired flexing of the top wall 74D of the crush box 44D. It is also noted that the energy-absorbing section 23D includes friction tabs 86D (FIG. 13) that extend onto the reinforcement beam 24D to assist in retaining the energy-absorbing section 23D to the reinforcement beam 24D. Also, the friction tabs 86D serve to reduce and prevent rattling of the energy-absorbing section 23D on the reinforcement beam 24D.

A modified component 21E (FIG. 15) includes a pair of U-shaped bends 82E (similar to bend 82A in FIG. 7) that replaces the rearward leg 77D. Its function and use is similar to that described in regard to component 21A, which will not be repeated. Also, end-positioned attachment tabs 88D are provided for snappingly engaging open ends of the two tubes in the B-shaped reinforcement beam 24D. As noted above, beams (24–24D) having differently shaped cross sections can be used with the present component (21–21D), and it is contemplated that the tabs 86D and 88D can be adjusted to frictionally engage the open ends of the beams for temporary securement of the component (21–21D) to the beam and for anti-rattle purposes and to center the component (21–21D) on the beam (24–24D).

Figure 17:
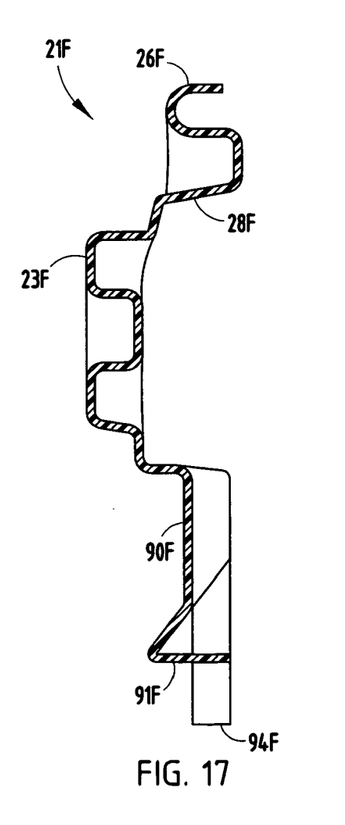
FIGS. 17 and 18 are cross sections taken along the lines XVII—XVII and XVIII—XVIII in FIG. 16.
Figure 18:
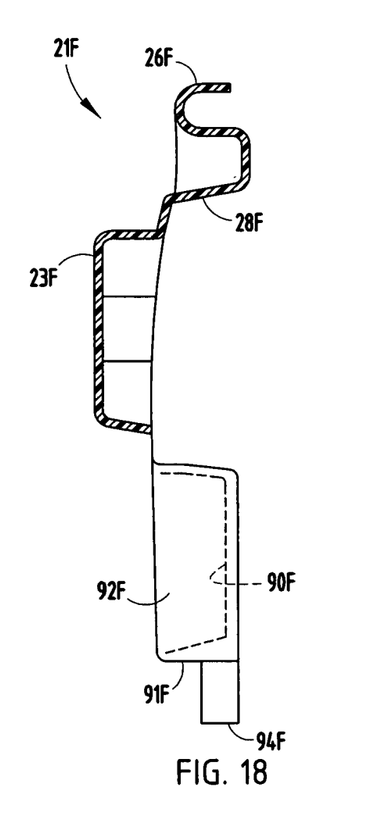

Component 21F (FIG. 16–18) is modified from the component 21 to include short beam sections 26F over ends of its energy-absorbing section 23F (such as for holding fascia under a headlight), with a pair of vertical connecting sections 28F supporting each short beam section 26F. Also, a lower air dam 89F (also sometimes called an "air redirector" or "air scoop") extends below the end of the energy-absorbing section 23F. The air dam 89F includes an inwardly angled floor 90F and two adjacent side walls 91F and 92F (wall 91F being a lower wall and wall 92F being an outboard wall) that combine with the floor 90F and end structures of the component 21F to funnel air inboard toward a center area under the energy-absorbing section 23F. It is contemplated that another air dam could be positioned horizontally under and across the vehicle front end to "pick up" this inwardly-directed air and funnel the air upward toward the vehicle's radiator and engine. A tab 94F extends below the air dam 89F and includes an apertured end for securing a lower part of the fascia thereto.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. In an end-forming component for a motor vehicle, the component having an energy-absorbing section and a fascia-supporting beam section, the energy-absorbing section being adapted to engage a face of a reinforcement beam and absorb energy upon a vehicle crash, and the beam section being adapted to support a vehicle fascia for aesthetics, an improvement comprising:
   at least one connecting section connecting the energy-absorbing section to the fascia-supporting beam section and being formed from material extending integrally and continuously from the energy-absorbing section and the beam section; the at least one connecting section retaining the energy-absorbing section and the fascia-supporting beam section together during assembly of the one-piece component onto a vehicle, but being flexible in a horizontal direction and extensible in a vertical direction to allow movement and collapse of the energy-absorbing section during the vehicle crash without forcing concurrent movement of the fascia-supporting beam section and without causing undesired damage to other vehicle components.

2. The apparatus defined in claim 1, wherein the at least one connecting section includes a pair of spaced-apart connecting sections each connecting the energy-absorbing section to the fascia-supporting beam section.

3. The apparatus defined in claim 2, wherein the at least one connecting section extends from a rear edge of the energy-absorbing section.

4. The apparatus defined in claim 3, wherein the at least one connecting section extends from a lower edge of the fascia-supporting beam section.

5. The apparatus defined in claim 1, wherein the at least one connecting section extends vertically from the energy-absorbing section.

6. The apparatus defined in claim 5, wherein the at least one connecting section includes a configured non-linear section adapted to reduce transmission of vibration between the energy-absorbing section and the beam section.

7. The apparatus defined in claim 1, wherein the fascia-supporting beam section defines a horizontal crossbeam extending a length approximately equal to the energy-absorbing section.

8. The apparatus defined in claim 7, wherein one of the energy-absorber section and the beam section includes an air redirector with a surface configured to direct air toward a center of the component.

9. The apparatus defined in claim 7, wherein the fascia-supporting beam section has a C-shaped cross section.

10. The apparatus defined in claim 1, wherein the fascia-supporting beam section defines a license plate attachment site.

11. The apparatus defined in claim 1, wherein the energy-absorbing section has top and bottom horizontal walls and vertical side walls forming longitudinally-separated crush box sections.

12. The apparatus defined in claim 11, wherein the crush boxes are interconnected by a base wall that extends between the side walls of adjacent ones of the crush boxes.

13. The apparatus defined in claim 1, including clips integrally formed in the material of one of the beam section and the energy-absorbing section, the clips being located in spaced-apart locations and being configured to receive and frictionally retain a wiring harness, while the wiring harness is positioned to communicate electrical power to different areas of the vehicle.

14. The apparatus defined in claim 1, wherein the beam section forms an enlarged aperture for passing air through the component and toward an engine of the vehicle, and including at least one vertical ridge that extends forward from a front surface of the beam section at a location outboard of the aperture, the vertical ridge being shaped and adapted to engage a back surface of the fascia to form an air dam that redirects air inwardly toward the enlarged aperture in the component.

15. The apparatus defined in claim 1, including at least one downwardly-extending air scoop that includes walls forming a forwardly-facing inwardly-open concavity which causes air flow to be directed inwardly toward a center of the component.

16. In an end-forming component for a motor vehicle, the component having an energy-absorbing section and a fascia-supporting beam section, the energy-absorbing section being adapted to engage a face of a reinforcement beam and absorb energy upon a vehicle crash, and the beam section being adapted to support a vehicle fascia for aesthetics, an improvement comprising:

at least one connecting section connecting the energy-absorbing section to the fascia-supporting beam section and being formed from material extending integrally and continuously from the energy-absorbing section and the beam section; the at least one connecting section retaining the energy-absorbing section and the fascia-supporting beam section together during assembly of the one-piece component onto a vehicle, but being flexible in a horizontal direction to allow movement and collapse of the energy-absorbing section during the vehicle crash without forcing concurrent movement of the fascia-supporting beam section and without causing undesired damage to other vehicle components, wherein the at least one connecting section has at least one back-and-forth bent resilient section.

17. The apparatus defined in claim 16, wherein the connecting section includes a pair of vertical walls that are flexible in a side-to-side direction relative to the vehicle and that are adapted to reduce transmission of side-to-side vibration from the energy-absorbing section.

18. In an end-forming component for a motor vehicle, the component having an energy-absorbing section and a fascia-supporting beam section, the energy-absorbing section being adapted to engage a face of a reinforcement beam and absorb energy upon a vehicle crash, and the beam section being adapted to support a vehicle fascia for aesthetics, an improvement comprising:

at least one connecting section connecting the energy-absorbing section to the fascia-supporting beam section and being formed from material extending integrally and continuously from the energy-absorbing section and the beam section; the at least one connecting section retaining the energy-absorbing section and the fascia-supporting beam section together during assembly of the one-piece component onto a vehicle, but being flexible in a horizontal direction to allow movement and collapse of the energy-absorbing section during the vehicle crash without forcing concurrent movement of the fascia-supporting beam section and without causing undesired damage to other vehicle components, wherein the energy-absorbing section includes anti-rattle tabs configured and adapted to frictionally engage top and bottom walls of the reinforcement beam.

19. In a motor vehicle having a polymeric molded component including a lower section adapted to absorb energy upon a vehicle crash to reduce vehicle damage and passenger injury, and including an upper section for supporting fascia above and around the lower section, an improvement comprising:

a polymeric connecting section connecting the upper and lower sections to facilitate simultaneous assembly to the motor vehicle but that is flexible and vertically extensible to allow the lower section to stroke with a reinforcement beam during the vehicle crash while the upper section remains relatively stationary on the vehicle, such that the vehicle fascia and other vehicle front or rear-end components undergoes less damage during the vehicle crash.

20. A method of assembling an energy-absorbing section and a fascia-supporting beam section to a vehicle front or rear-end, including positioning the energy-absorbing section on a reinforcement beam and positioning fascia on the fascia-supporting beam section, the method comprising steps of:

connecting the energy-absorbing section to the fascia-supporting beam section using connecting sections made with material integral and continuous to the energy-absorbing and fascia-supporting beam sections; the connecting sections being configured to and adapted to support the energy-absorbing section under the fascia-supporting beam section for handling as a one-piece component during assembly, but being vertically extensible and configured to flex after assembly to minimize transmission of vibration from the bumper beam to the energy-absorbing section.

21. A structural component for a motor vehicle for supporting fascia along an end of the vehicle, comprising:

a beam section configured and adapted to support fascia at selected locations across a front end of a vehicle; the beam section, when positioned in a vehicle-mounted position, extending horizontally; and spaced apart corner-forming structures integrally connected to and molded with the beam section to form a unitary post, the corner-forming section extending downwardly from the beam section and forming at least one air-flow aperture therebetween that is below the beam section, the corner-forming structures each having a front surface contoured and shaped to support the vehicle fascia at selected locations but that is adapted to be spaced from the fascia in other locations, and further the corner-forming sections each having a fin protruding in front of the corner-forming structure to define a vertical ridge that closely engages a rear surface of the fascia to seal off undesired lateral air flow between the fascia and the corner-forming sections.

22. The structural component defined in claim 21, wherein the vertical ridges are each at least about 3 inches high, and about 1 inch deep.

23. The structure component defined in claim 21, including an energy-absorbing section positioned below the beam section and including connecting sections connecting the energy-absorbing section to the beam section, the connecting sections retaining the energy-absorbing section and the beam section together during assembly onto a vehicle, but being flexible in a horizontal direction to allow movement and collapse of the energy-absorbing section during the vehicle crash without forcing concurrent movement of the beam section and without causing undesired damage to other vehicle components.

24. A structural component for a motor vehicle, comprising:
- an energy-absorbing section having a base flange adapted to matably engage a face surface of a reinforcement beam and having crush boxes formed forwardly from the base flange for absorbing impact energy upon a vehicle crash; and
- at least one air scoop that includes walls forming a forwardly-facing and inwardly-open concavity above the energy-absorbing section and which causes air flow to be directed inwardly toward a center of the structural component, the air scoop being integrally connected to and molded with the energy-absorbing section;
- the energy-absorbing section including a fin protruding upwardly from one of the crush boxes to define a vertical ridge that sealingly engages and supports the fascia.

25. The structural component defined in claim 24, wherein the air scoop includes an inwardly angled floor wall at a bottom of the concavity of the air scoop.

26. The structural component defined in claim 24, including a beam section positioned above the energy-absorbing section, and including connecting sections connecting the energy-absorbing section to the beam section, the connecting sections retaining the energy-absorbing section and the beam section together during assembly onto a vehicle, but being flexible in a horizontal direction and extensible in at least one direction to allow movement and collapse of the energy-absorbing section during the vehicle crash without forcing concurrent movement of the beam section and without causing undesired damage to other vehicle components.

* * * * *

UNITED STATES PATENT AND TRADEMARK OFFICE
Certificate

Patent No. 6,997,490 B2　　　　　　　　　　　　　　　　　　　　　Patented: February 14, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Darin Evans, Wixom, MI (US); Anthony Jackson, Canton, MI(US); Mark H. Campbell, Pickering, Ontario, Canada; and Daniel M. Bangala, Maple, Ontario, Canada.

Signed and Sealed this Sixth Day of June 2006.

D. GLENN DAYOAN
*Supervisory Patent Examiner*
Art Unit 3612